United States Patent [19]

Stein

[11] Patent Number: 5,183,075
[45] Date of Patent: Feb. 2, 1993

[54] CHECK VALVE

[76] Inventor: Günter Stein, Waihengeyerstr. 1, 8882 Lauingen, Fed. Rep. of Germany

[21] Appl. No.: 501,395

[22] Filed: Mar. 28, 1990

Related U.S. Application Data

[63] Continuation of Ser. No. 314,870, Dec. 12, 1988, abandoned.

[30] Foreign Application Priority Data

| Apr. 12, 1986 | [DE] | Fed. Rep. of Germany | ....... 3612393 |
| Aug. 16, 1986 | [DE] | Fed. Rep. of Germany | ....... 3627865 |
| Aug. 16, 1986 | [DE] | Fed. Rep. of Germany | ....... 3627865 |

[51] Int. Cl.⁵ ............................................. F16K 15/04
[52] U.S. Cl. .............................. 137/493.6; 137/512.5; 137/514.3; 137/514.5; 137/539; 137/543.21; 251/368
[58] Field of Search .................. 137/539, 539.5, 512.5, 137/543.21, 493.6, 514.3, 514.5; 251/368

[56] References Cited

U.S. PATENT DOCUMENTS

| 654,552 | 7/1900 | Morris | 137/543.21 |
| 676,855 | 6/1901 | Shoemaker | 137/543.21 |
| 1,398,967 | 12/1921 | Humason et al. | 137/543.21 |
| 2,451,586 | 10/1948 | Strid | 137/539 X |
| 2,697,915 | 12/1954 | Chisholm | 137/543.2 X |
| 2,755,816 | 7/1956 | Collins | 137/496 |
| 3,153,423 | 10/1964 | Biello | 137/493.5 |
| 3,894,556 | 7/1975 | Pareja | 137/539 |
| 4,246,002 | 1/1981 | Bell | 251/368 X |
| 4,368,752 | 1/1983 | Tamamori et al. | 137/512.5 |
| 4,662,392 | 5/1987 | Vadasz | 251/368 |

FOREIGN PATENT DOCUMENTS

| 1135124 | 8/1962 | Fed. Rep. of Germany | ...... 137/539 |
| 3112932 | 12/1982 | Fed. Rep. of Germany | ...... 137/539 |
| 71545 | 1/1960 | France | ............... 137/543.21 |
| 57-167572 | 10/1982 | Japan | . |
| 2053423 | 2/1981 | United Kingdom | ................ 137/539 |

Primary Examiner—John Rivell
Attorney, Agent, or Firm—Edwin E. Greigg; Ronald E. Greigg

[57] ABSTRACT

Check valve with a movable valve element (3), especially a valve element that is manufactured from a ball, said valve element possessing a spherical surface (7) which faces a valve seat (5) and serves as a sealing surface, possessing a radial guidance zone (11) that faces a bore (1) inside which it itself is received, and containing recesses (8) for the medium flow, said recesses connecting the region (9) of the bore (11) upstream of the guidance zone (11) to the region (10) downstream thereof.

15 Claims, 5 Drawing Sheets

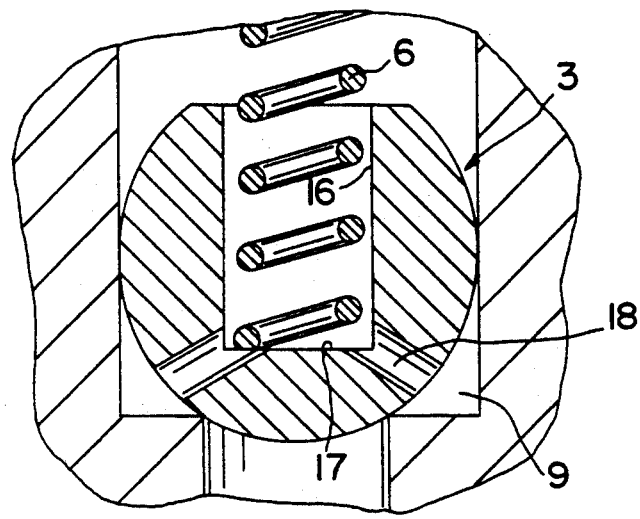
FIG.3
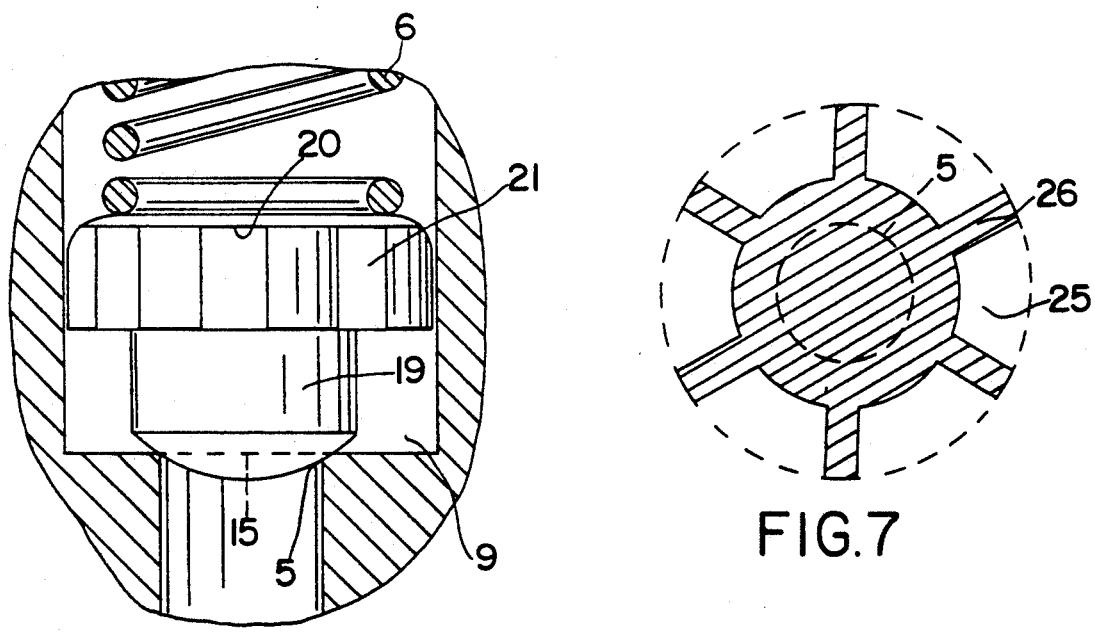
FIG.4
FIG.7

CHECK VALVE

This is a continuation of copending application Ser. No. 314,870 filed Dec. 12, 1988 now abandoned.

PRIOR ART

The invention starts from a check valve of the generic type specified hereinafter. Check valves are employed in a multiplicity of ways as means of preventing reverse flow, and also as valves that are designed to prevent discharge from a line, in the flow direction, after the inlet-side pressure has been shut off. The closing force that acts on the closing element in the closing direction can be generated by a closing spring, or else by the dead weight of the closing element if the check valve is installed appropriately, i.e. vertically. The quality of sealing is governed by the mating of the valve element with the valve seat, and this mating is particularly advantageous when the movable valve element has a spherical sealing surface which is relatively hard and co-operates with a conical or sharp-edged valve seat composed of a softer material. The valve seat then has a limited ability to conform to the spherical surface of the movable valve element, so that sealing problems will not arise even as a result of the valve element twisting.

In check valves of the abovementioned type, a prerequisite for through-flow is that flow should be able to bypass the radial guidance zone, i.e there must be a connection between the regions upstream and downstream of this guidance zone, namely a connection that has to exist for the entire length corresponding to the opening travel of the movable valve element, and this necessitates a comparatively bulky check valve assembly, especially insofar as its diameter is concerned.

In a known check valve of this generic type (U.S. Pat. No. 3,457,949), the spherical sealing surface of the movable valve element is adjoined by a larger-diameter, pot-shaped extension of the element, this extension exhibiting radial surfaces for the through-flow—these being formed by grinding—and a closing spring bears against its bottom. The larger diameter of the pot-shaped extension, exceeding twice the radius of the spherical sealing surface, correspondingly results in the check valve having a relatively large overall diameter.

OBJECT OF THE INVENTION

The object underlying the invention is to develop a check valve which is of the generic type that has been mentioned, which has the smallest possible overall diameter, and in which the friction arising during guidance of the valve element is minimized.

ADVANTAGES OF THE INVENTION

The check valve according to the invention, which achieves this object, has the advantage, on the other hand, that the movable valve element is radially guided in a substantially friction-free manner, and that while the advantages of a ball-type check valve are retained, the medium can flow via the recesses, and the external dimensions of the valve are at the same time kept as small as possible. Moreover, since there is radial guidance, the medium flow causes the valve element to be self-centering as regards its spherical surface which faces the valve seat, thus guaranteeing that the check valve exhibits good leaktightness by virtue of the bedded-in mating of the valve element with the valve seat.

A check valve according to the invention occupies a minimum of space and can be installed, with advantage, in casings that serve other purposes as well, for example by boring-out an existing duct so as to form the bore that serves as the flow passage. The mating that has been mentioned can also be influenced by different combinations of materials, such as a casing with a plastic valve seat and a movable valve element that is made of metal, in particular steel, or else a metal casing and a plastic ball.

According to an advantageous embodiment of the invention, the recesses in the valve element are arranged symmetrically with respect to the centre, so that the medium flow causes the valve element to be self-centering, and no additional axial guidance of the valve element is necessary beyond that which is provided by the radial guidance zone.

According to a further advantageous embodiment of the invention, the valve element can be loaded by means of a closing spring which acts on one of its surfaces that extends transversely to the direction of opening. This surface can be provided at various locations, advantages being obtained if it is as close as possible to the actual sealing surface of the check valve, so as to allow the use of as long a closing spring as possible, and hence to enable the movable valve element to have a correspondingly long travel distance. The closing spring can be designed as a wire spring (helical spring), but it could also be designed as a resilient block, or as a leaf spring. Some of the spring turns can be configured as a block, so as to provide guidance.

According to a further advantageous embodiment of the invention, an annular groove is provided in the spherical surface on the front of the valve element, facing the valve seat in the region between the valve seat and the guidance zone, this annular groove being transverse to the flow direction and constituting a feature from which the recesses that conduct the medium flow start. An annular groove, configured in this way, not only reduces the weight of the movable valve element without thereby impairing the radial guidance, but at the same time serves as a means of conducting the medium.

According to a further advantageous embodiment of the invention, a blind aperture is provided in the valve element, at the end which faces away from the valve seat, this blind aperture likewise contributing to reducing the weight of the valve element, while its bottom surface can serve to support the closing spring. Moreover, ducts that serve as recesses can open into this blind bore. Due to the fact that at least a portion of the closing spring is received inside this blind bore, it is also possible to increase the total length of the spring, with the advantage—as already mentioned—of keeping the overall length of the valve comparatively small. At the same time, it is also possible, according to the invention, to design the spring in a manner such that its portion which plunges into the blind bore is configured as a spring block, so as to obtain additional axial guidance. Furthermore, according to the invention, the rear of the valve element can also be faced-off to a flat, and in the extreme case this can be continued as far as the bottom surface of the blind bore.

According to the invention, the recesses for the medium flow can be configured in different ways—these being the recesses that are provided for through-flow from the bore region upstream of the radial guidance zone, to the region downstream thereof. In each case, the sole requirement is that radial guidance of the movable valve element be preserved. Thus, connecting ducts which connect the two regions can serve as recesses, according to the invention, by virtue of the fact that they lead from the blind bore that has been mentioned, to the annular groove that has been mentioned as being provided in the valve element, without thereby spoiling the spherical shape in the sealing zone, or else in the guidance zone. However, the recesses can also be provided in the cylindrical surface that is associated with the spherical shape, the limiting case being the one in which all that remains are ribs for providing the radial guidance and a spherical cap for the location at which sealing occurs.

According to a further advantageous embodiment of the invention, the check valve can be configured as a double check valve, with a first valve element, which acts in only one flow direction, and a second valve element, which acts in another flow direction. By configuring the check valve in this manner, a line will indeed be shut off at low pressures, for example to prevent discharge from it, but on the other hand throughflow is assured in both directions. According to the invention, the second movable valve element can be installed, with advantage, inside a central bore in the first movable valve element, this central bore serving as a corresponding flow passage for the other flow direction. This assembly configuration exploits the smallest dimension of a ball-type valve element—this dimension being fixed in any case—for the purpose of accommodating an additional check valve without having to increase the diameter for this reason. At the same time, the central bore can be stepped, its step edge serving as a valve seat. Since in the case of this configuration the medium can flow only in either of two directions, the helical spring of the second valve element can, according to the invention, be supported against a shoulder of the valve body that houses the first valve element, without altering the actual opening force, the reason being that the second valve element opens only when the first one is closed. The most important consequence of this configuration is a simplification of the construction.

According to a further advantageous embodiment of the invention, the check valve according to same is employed in a fuel injection system for internal combustion engines, and in particular as a pressure relief valve. High frequencies occur in fuel injection systems, so that the valve operating times are very short, while the accompanying pressures are high and there is the further requirement that the check valve must close tightly, since leakage flows can lead to significant departures from uniform-distribution conditions. If the valve is employed as a pressure relief device, the recesses can be configured in a manner such that during the closing action they cause a throttling effect which can be applied until the so-called torque-matching adjustment is made to the fuel metering.

The check valves according to the invention can of course be employed also as pressurizing valves, i.e. for applications in which the primary actuating variables are the spring force and the area to which the pressure is applied. By reason of the fact that the invention basically prescribes that a spherical cap should serve as the sealing surface of the movable valve element, and that, moreover, guidance occurs at only a line—due to the spherical configuration in this zone of the valve element—the outcome is that the design parameters are easily manageable. Of course, it would also be possible to produce a valve element according to the invention from a blank that has been given some other shape, rather than from a ball, but the sealing surface must as a matter of principle be configured as a spherical cap, and the radial guidance zone must likewise be given a convex shape.

According to a further advantageous embodiment of the invention, the movable valve element co-operates with a device that damps its opening and/or closing movements. A damping device of this kind can be desirable in some applications, since the check valve according to the invention is essentially of the fast-opening and fast-closing type, with large control areas and spring forces that are, if possible, comparatively low, allied to minimal frictional forces. According to the invention, a chamber can serve as the damping device, the volume of this chamber varying as the movable valve element moves. In addition, this chamber possesses an orifice that acts as a flow restrictor, and a suitable chamber can be formed by a blind cylindrical bore which extends in the direction of movement of the valve element, and into which a damping piston plunges, this damping piston, or the cylindrical bore, being located on the movable valve element. For example, a spigot on the movable valve element can thus serve as a damping piston.

According to an advantageous embodiment of this damping device, parts of it can serve as a stop which limits the opening travel of the movable valve element, such a part being a nipple which contains the blind bore or the damping piston. It is obvious that such a stop can also be formed by the bottom of the blind bore, or by the end face of the spigot or damping piston.

According to a further advantageous embodiment of the invention, the recesses are formed by obliquely-ground surfaces, thus enabling the open cross-section between the valve element and the body to be kept substantially constant. Besides this conventional, cutting-type machining of the valve element, it is also possible, according to the invention, to produce the recesses by electroerosive machining, for example by means of a process in which the desired recesses are electroeroded in a premanufactured, prehardened ball, in a manner such that all that remains is the spherical cap at the sealing end, plus portions of the spherical surface for providing the radial guidance inside the bore. The use of electroerosion also enables the valve element according to the invention to be manufactured in a particularly economical manner from mass-produced balls which exhibits an excellent surface finish.

Further advantages and advantageous embodiments of the invention can be inferred from the description which follows, from the claims, and from the drawing.

DESCRIPTION OF THE DRAWING

Several illustrative embodiments of the subject matter of the invention are depicted in the drawing and are described in greater detail in the paragraphs which follow. In the drawing.

FIGS. 3 and 4 show the second and third illustrative embodiments, in longitudinal section;

FIG. 7 shows the fifth illustrative embodiment, in transverse sections;

DESCRIPTION OF THE ILLUSTRATIVE EMBODIMENTS

Figure 1:
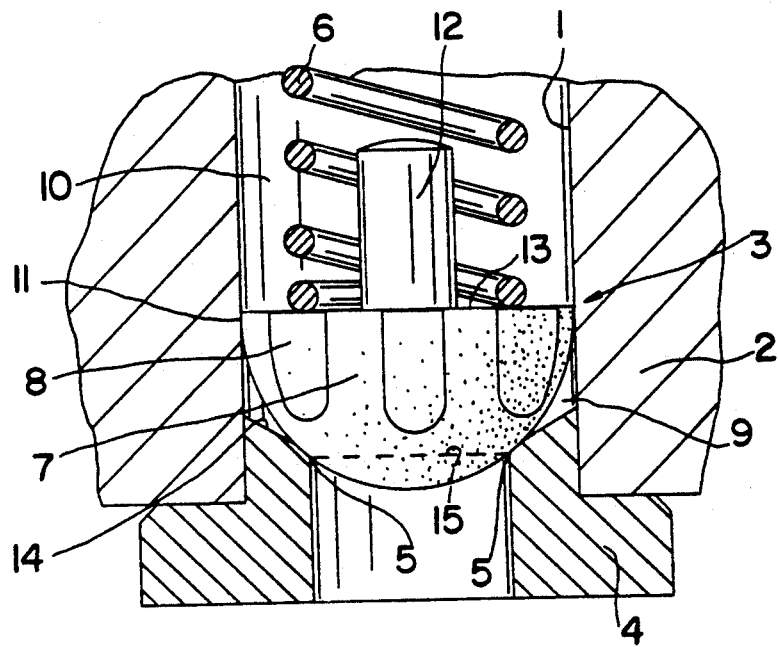
FIGS. 1 and 2 show the first illustrative embodiment, in longitudinal section and transverse section.
Figure 2:
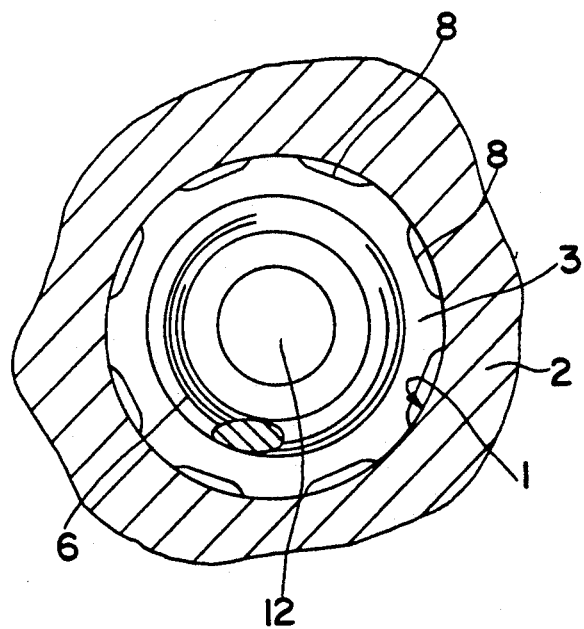

In the first illustrative embodiment, shown in FIGS. 1 and 2, a movable valve element 3 is radially guided inside a central bore 1 in a valve body 2, and is installed in a manner such that it can move axially. An inset ring 4 is associated with the valve body 2, the valve element 3 bearing the against this ring 4, which exhibits a valve seat 5. A closing spring 6 applies a load to the valve elements 3, in the direction of the valve seat 5.

At the end facing the valve seat 5, the movable valve element 3 has spherical surface portion 7, which contains axially aligned recesses for the medium flow, these recesses—formed by flats 8-being radial with respect to the flow direction. As soon as the valve element 3 lifts from the seat 5, the medium can flow, inside the bore 1, from the region 9 and into the region 10 via the flats 8, the area of the spherical surface portion 7 remaining between the flats 8 serving as a guidance zone 11 inside the bore 1. A cylindrical portion 12 is provided at that end of the valve element 3 which faces away from the valve seat 5, together with a surface, 13, which extends transversely to the flow direction, and on which the closing spring 6 bears. Here, the closing spring is designed as a wire helix, but it can equally well be designed as a resilient cylinder or as a conical coil spring, or else to configured in some other way.

Although the ring 4 has a conical surface 14 on the side facing the valve element 3, sealing actually occurs along a line 15. In every case, this line 15 lies within that area of the spherical surface portion 7 which does not contain recesses, so that overlapping with the flats 8 is rendered impossible.

Specifically in the case of this first illustrative embodiment, the movable valve element 3 is shaped from a ball, in that the cylindrical portion 12, the surface 13 and the flats 8 are produced by means of appropriate machining operations-i.e. recesses are formed at appropriate locations. A mass-produced spherical metal ball can preferably be used for this purpose, and if such a ball is specified the machining is then performed by means of a process such as electroerosion, in which the condition of the remaining spherical surface suffers no deterioration in its quality, i.e. in its hardness and smoothness. This quality of the spherical surface portion 7 is indeed the factor that governs both the quality of sealing at the valve seat 5 and the quality of guidance at the zone 11.

The second illustrative embodiment is shown in FIG. 3, in which the valve body and the valve seat are represented in a highly simplified form, so as to explain the details of the valve element 3, which is shown in longitudinal section. In this illustrative embodiment too, the movable valve element is manufactured from a spherical ball, and is radially guided according to the invention, by the spherical surface. Furthermore, the movable valve element contains a blind bore 16, its bottom surface 17 serving as a bearing surface for the closing spring 6, while connecting ducts 18 are provided in the valve element, extending obliquely with respect to the flow direction and connecting the region 9 to the blind bore 16. As soon as the movable valve element 3 lifts from the seat, the medium that then flows in can flow from the region 9, enter the blind bore 16 via the connecting ducts 18, and thence flow onwards from the check valve, uncontrolled.

In the third illustrative embodiment, which is shown in FIG. 4, an annular groove 19 is provided in the spherical surface, downstream of the valve seat 5, this groove 19 effecting a reduction in the weight of the movable valve element, on the one hand, and an improvement in the flow paths to the recesses, on the other hand. The volume of the region 9 is increased as a result of the presence of this groove 19. Flats can serve as the recesses, as in the first illustrative embodiment, or else ducts or some other form of ducting inside the closing elements, bypassing its guidance zone, as in the second illustrative embodiment. In every case, however, the annular groove 19 is situated far enough from the sealing line 15 to ensure that overlapping with the valve seat 5 is rendered impossible. In this illustrative embodiment, as a further feature, that end of the movable valve element which faces away from the valve seat 5 is flat-finished, thereby creating a plane surface 20, against which the closing spring 6 bears.

Figure 5:
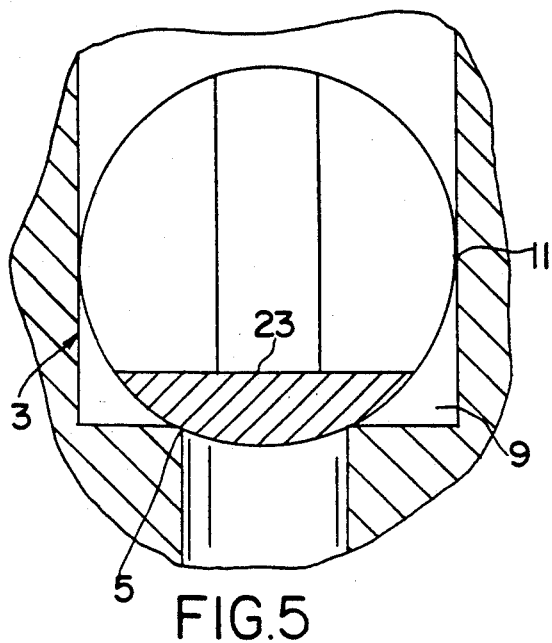
FIGS. 5 and 6 show the fourth illustrative embodiment, in longitudinal section and transverse section.
Figure 6:
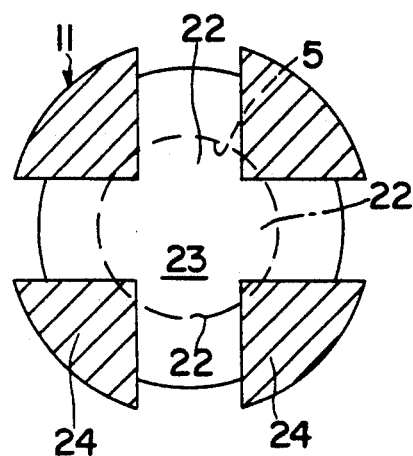

In the fourth illustrative embodiment, shown in longitudinal section in FIG. 5 and in transverse section in FIG. 6, the movable valve element 3 is of spherical configuration, and two deep, centrally intersecting incisions 22 are made in its rear, and are carried down beyond the guidance zone 11, towards the valve seat 5. A substantial weight reduction is thus achieved, without any consequential reduction in the quality of the radial guidance zone 11. In this case, the closing spring is omitted from the drawing, but it can be designed in widely differing ways, as in the other illustrative embodiments. In every case, it can bear against the cut bottom 23 of the deep incisions 22. However, it can also rest against the four columns which are left standing, marked 24. The deeper the incisions 22 are carried down, the larger becomes the open cross-section that they provide for through-flow from the region 9.

In the fifth illustrative embodiment, which is shown in FIG. 7, the movable valve element is likewise of spherical configuration, here shown in transverse section. This illustrative embodiment basically corresponds to the first illustrative embodiment, the flats that were described in that context now being enlarged to form deep recesses 25. As a' result, only ribs 26 remain for providing the radial guidance. These deep recesses 25 can be combined, according to the invention, with a configuration similar to that of the first illustrative embodiment, comprising a cylindrical portion, or with a configuration similar to that of the second illustrative embodiment, comprising a blind bore.

Figure 8:
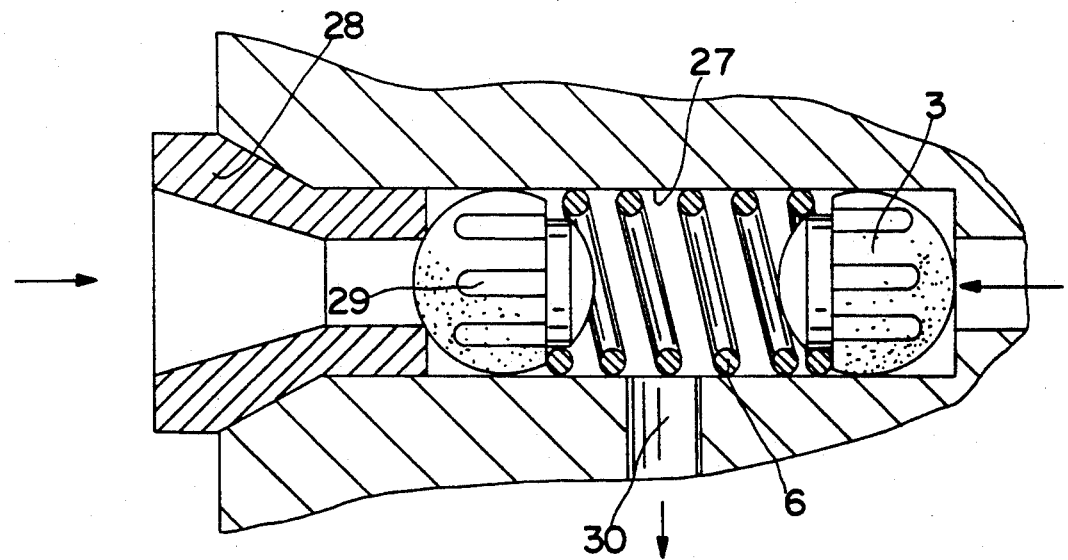
FIG. 8 shows the sixth illustrative embodiment, as two check valves with one spring.

As a sixth ilustrative embodiment, FIG. 8 shows an application within an injection system, in which the valve element 3, which is not shown in detail here, but may be of any of the designs according to the invention, is installed inside a bore 27 in a casing, this bore 27 being terminated by a conical nipple 28, it orifice-edge serving as a valve seat for a second valve element 29, the closing spring 6 bearing against the rear of said valve element. In a fuel injection system, the fuel can thus flow in from either side, via the valve elements 3 and 29, so as then to be free to flow away via an outlet 30 inside the space that receives the spring 6. It is clear that this illustrative embodiment is not restricted to injection systems, but instead offers advantageous possibilities of application to very complicated systems of this general type. In FIG. 8, the valve element 3 is shown in the open position.

Figure 9:
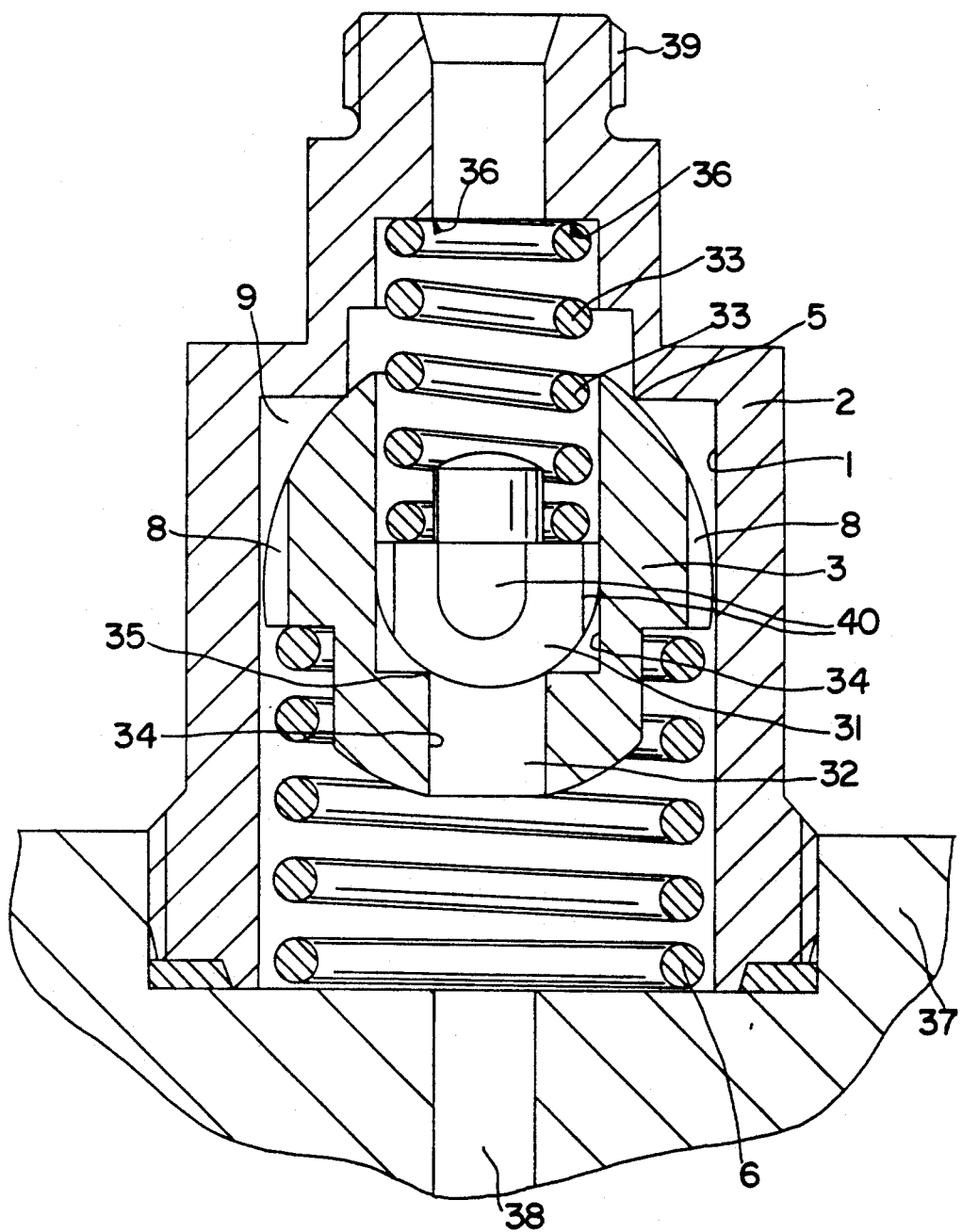
FIG. 9 shows the seventh illustrative embodiment, in the form of a double check valve.

The seventh illustrative embodiment is shown in FIG. 9, and takes the form of a double check valve which can likewise be employed in a particularly advantageous manner within injection systems. Whereas the basic design of the movable valve elements can be the same as in the other illustrative embodiments, in this case a second valve element 31 is installed coaxially inside the movable valve element 3, which serves as the first valve element, the second valve element 31 opening in the opposite direction to the first element, controlling a second flow passage 32 inside the first element and being loaded by a closing spring 33. Whereas the first movable valve element 3 is radially guided inside a bore 1 in the valve body 2, and is loaded by a closing spring 6, just as in the other illustrative embodiments, the second movable valve element 31 is radially guided inside the larger-diameter portion of a stepped bore, 34, which is centrally located within the movable valve element 3, and in which the annular step-edge 35 serves as a valve seat. Whereas this second movable valve element 31 can in principle be designed in the same way as in the other illustrative embodiments, the design of the element shown here, in FIG. 9, corresponds to the first illustrative embodiment. The closing spring 33 of this second valve element 31 is supported against a shoulder 36 of the valve body 2. Either the first or second check valve will open, depending on the flow direction of the medium that is to be controlled.

For employment in fuel injection systems, this seventh illustrative embodiment can bed configured as a constant-pressure relief valve, the body 2 being designed as a threaded nipple which can be screwed into an injection pump casing 37, namely at the end of a pressure duct 38. A pressure line that leads to the injection nozzle can be screwed onto a thread 39 on that end of this nipple which faces away from the injection pump casing 37. During the injection process, which takes place under high pressure, the fuel flows towards the injection nozzle via the second check valve 31, 32, 35 and the flats 40 on the second movable valve element 31. Once the injection has ended, the dynamic pressure that builds up in the pressure line lifts the first movable valve element 3 from its valve seat 5 until the overpressure has decayed to the normal filling pressure. Because the cross-section is comparatively large, this fall in pressure occurs very rapidly, given that there is a minimum of dead space. Should some kind of pressure equalization or further depressurization be desired, the first movable valve element 3 can of course be provided with additional flow-restriction points, which can for example have a throttling effect that varies as a function of travel distance. Otherwise, the parameters which are known in injection technology, concerning so-called pressure valves, can be carried over to the invention by making appropriate modifications to the actual invention, namely to check valve ball seats and spherical guidance arrangements.

Figure 10:
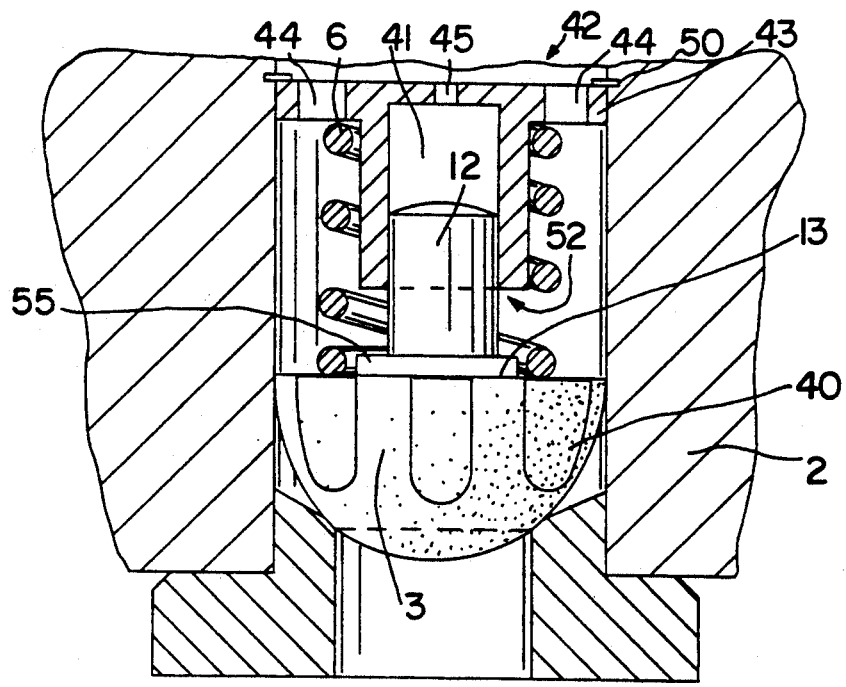
FIG. 10 shows the first illustrative embodiment, which was shown in FIG. 1, but here in the form of a modified version that incorporates a damping device.

FIG. 10 shows a modification of the first illustrative embodiment, in the form of a damping device. Here, the cylindrical portion 12 of the movable valve element 3 plunges into a blind cylindrical bore 41 in a nipple, 42, which has a flange 43. This flange 43 is inserted into the central bore 1 in the body 2, and is secured there by means of a circlip 50, so that it cannot be displaced. In addition, that end of the closing spring 6 which faces away from the movable valve element 3 is supported against this flange 43. Ports 44 are provided in the flange 43, and serve as passages for medium through-flow.

The cylindrical portion 12 is radially guided inside the blind cylindrical bore 41, in a manner such that a substantial degree of leaktightness is achieved, and a flow-restricting bore 45, possessing a defined cross-section, is provided at the bottom of this blind cylindrical bore, so that the cylindrical portion 12 in the cylindrical bore 41 acts like a piston whenever the valve element 3 moves axially, and either displaces the medium outwards through the flow-restricting bore 45 during an opening movement, or draws it in during a closing movement. If the closing spring 6 is strong enough, the check valve can be closed even if a pressure depression is created in the blind bore 41, this pressure depression gradually decaying, via the flow-restricting bore 45, once the closing action has occurred. Conversely, the closing spring 6 can, of course, also be designed to be so weak that the pressure depression slows the closing action. In place of a flow-restricting bore 45, a radial clearance between the spigot 12 and the inside wall of the blind cylindrical bore 41 can also give rise to the throttling effect, or flow-restricting ducts can, according to the invention, be provided in this inside wall and/or within the cylindrical portion, these ducts forming a defined flow-restricting cross-section.

Figure 11:
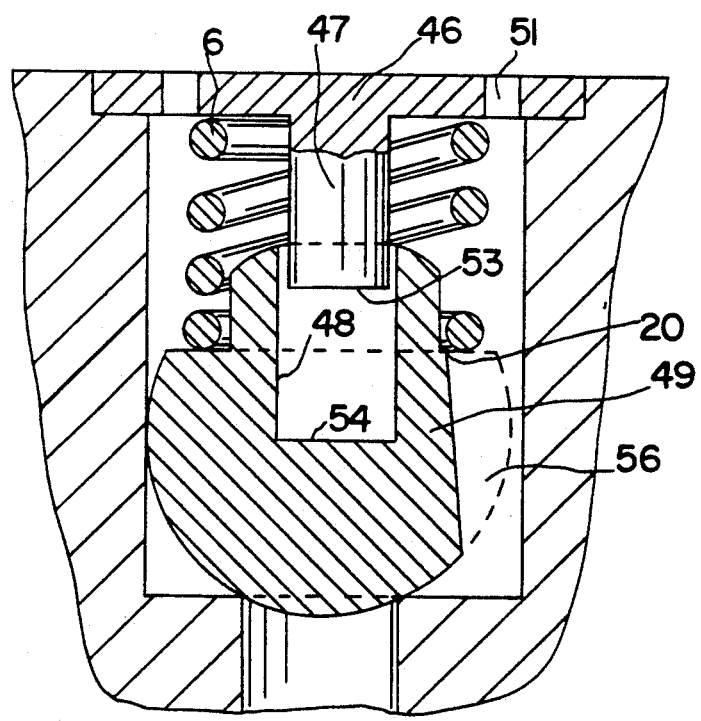
FIG. 11 shows the eighth illustrative embodiment, including another version of a damping device.

FIG. 11 shows a modified version of the third example—which was shown in FIG. 4—but in combination with a further illustrative embodiment. A cylindrical portion 47 is provided on a baseplate, 46, which is rigidly fastened to the body, this cylindrical portion 47 projecting into a corresponding blind axial bore 48 in the movable valve element 49. Here too, it is possible either to provide a separate flow-restricting bore inside the blind bore 48, or to groove the cylindrical surface of the cylindrical portion 47 or the wall of the blind bore 48, the resulting grooves serving as defined flow-restricting passages—or else the clearance can itself produce the throttling effect. Here, the baseplate 46 serves as an abutment for the closing spring 6, and contains ports 51 for medium through-flow.

Moreover, these devices serve as a stop, and hence limit the maximum opening travel of the movable valve elements, 3 or 49 as the case may be. In the case of the version shown in FIG. 10, the stop is formed by virtue of the fact that the end face 52 of the nipple 42 strikes a collar 55 once the movable valve element 3 has moved through its opening travel. In the case of the version shown in FIG. 11, the travel is defined by the end face 53 of the spigot 47 striking the bottom 54 of the blind bore 48.

The eighth illustrative embodiment can be understood from FIG. 11. In order to obtain a substantially constant open cross-section once the check valve has opened, three ground surfaces 56 are provided on the movable valve element 49, as recesses in accordance with the invention, these ground surfaces 56 converging on the cylindrical portion 47 in the flow direction. The lower these ground surfaces begin, the larger is the radial cross-section that is open, this being so by virtue of the spherical shape, so that the upwardly increasing distance between the ground surfaces and the bore wall results in full self-adjustment of this open cross-section.

The features which are presented in this description, in the claims that follow, and in the drawing, can all be essential to the invention, both individually and in any desired combination with one another.

I claim:

1. A check valve including a valve body with a bore that serves as a flow passage, an inset ring (4) secured to said valve body, said inset ring having a flow passage coaxial with said flow passage in said valve body, said inset including a conical face which forms a conical valve seat along said conical face, a movable valve element which has a spherical surface portion that co-operates with said conical valve seat in a manner such that sealing is achieved, said movable valve element being installed in said valve body in a manner such that said movable valve element is radially guided at its upper end by a radial guidance zone inside said bore which bore extends in a direction of opening of said valve, said movable valve element contains axially aligned recesses in an outer surface portion therein for a medium to flow downstream through said axially aligned recesses away from said valve seat, said axially aligned recesses interconnecting medium flow regions upstream and downstream of the radial guidance zone, and said movable valve element being subjected to a force that acts in a closing direction, said movable valve element (3) being manufactured from a spherical ball, said movable valve element including a spherical surface portion (7) so that there is a radial line-contact of said movable valve element with the bore (1), and said recesses (8, 18) in said movable valve element for the medium flow extend along the spherical surface portion (7) between a zone which seats upon said valve seat (5) and the radial guidance zone (11) whereby fluid flows from said axially aligned recesses into said bore.

2. Check valve according to claim 1, characterized in that the recesses (8, 22, 25) in the valve element (3) are arranged symmetrically with respect to its center, so as to keep said valve element (3) centered in the position in which it is guided and exercises control.

3. Check valve according to claim 1, characterized in that the force that acts in the closing direction is generated by a closing spring (6, 33) which acts on a surface (13, 17, 20) on the valve element (3, 31, 49), said surface extending transversely to the direction of opening.

4. Check valve according to claim 1, characterized in that a portion of the recesses is formed by an annular groove (19) which is located in the spherical surface (7), transversely to the flow direction and in the region (9) between the valve seat (5) and the guidance zone (11).

5. Check valve according to claim 1, characterized in that a blind aperture (16, 48) is provided in the valve element (3, 49), at the end which faces away from the valve seat (5).

6. Check valve according to claim 1, characterized in that the recesses (8, 21, 25, 56) are located on the valve element (3, 49) and are open towards the wall of the bore (1).

7. Check valve according to claim 1, characterized in that at least some of the recesses (18) extend completely through the valve element (3).

8. Check valve according to claim 1, characterized in that the valve element (3) exhibits incisions (22) at the end which faces away from the valve seat (5), their cut bottom (23) extending as far as the region (9) upstream of the guidance zone (11).

9. Check valve according to claim 1, characterized by being configured as a double check valve with a first valve element (3), which acts in one flow direction, and a second valve element (29, 31), which acts in another flow direction.

10. Check valve according to claim 9, characterized in that the second valve element (31) opens in the opposite direction to the first valve element (3), and is installed inside a central bore (34) in the first valve element (3), this bore serving as a corresponding flow passage (32).

11. Check valve according to claim 1, characterized in that the movable valve element (3, 49) co-operates with a damping device (12, 41, 47, 48) for its opening and/or closing movements.

12. Check valve according to claim 1, characterized in that the movable valve element is composed of a non-metallic material, particularly a ceramic.

13. A check valve as set forth in claim 1 in which said movable valve element includes a coaxially extending cylindrical portion extending in a fluid flow direction from said spherical surface portion.

14. A check valve as set forth in claim 2 in which said movable valve element includes a coaxially extending cylindrical portion extending in a fluid flow direction from said spherical surface portion.

15. A check valve as set forth in claim 1 in which said axially aligned recesses direct a flow medium away from said conical face of said inset between said valve seat and said bore in said valve body.

* * * * *